United States Patent [19]

Fennern et al.

[11] Patent Number: 5,406,597
[45] Date of Patent: Apr. 11, 1995

[54] BOILING WATER REACTOR INCLUDING SPLIT CONTROL ROD DRIVES

[75] Inventors: Larry E. Fennern, San Jose; Roy C. Challberg, Livermore; Nilkanth T. Patel, San Jose; Russell M. Fawcett, San Jose; Richard A. Ose, San Jose; Charles W. Dillmann, Morgan Hill; Steven A. Hucik, San Jose, all of Calif.

[73] Assignee: General Electric Company, San Jose, Calif.

[21] Appl. No.: 908,119

[22] Filed: Jul. 2, 1992

[51] Int. Cl.$^6$ .............................................. G21C 7/06
[52] U.S. Cl. ................................... 376/232; 376/353; 376/230; 376/370
[58] Field of Search ................ 376/232, 353, 230, 370

[56] References Cited

U.S. PATENT DOCUMENTS

| | | | |
|---|---|---|---|
| 3,406,093 | 10/1968 | Paratesi et al. | 176/36 |
| 3,957,577 | 5/1976 | Treshow | 176/36 R |
| 4,030,972 | 6/1977 | Groves | 176/36 R |
| 4,044,622 | 8/1977 | Matthews | 74/424.8 R |
| 4,326,922 | 4/1982 | Ferrari et al. | 376/435 |
| 4,518,559 | 5/1985 | Fischer et al. | 376/230 |
| 4,775,506 | 10/1988 | Duborg | 376/230 |
| 4,904,443 | 2/1990 | Carruth | 376/233 |
| 5,019,328 | 5/1991 | Niino et al. | 376/310 |

FOREIGN PATENT DOCUMENTS 3814860 11/1989 Germany .

OTHER PUBLICATIONS

D. R. Wilkins et al, "Advanced BWR: Design Improvements Build on Proven Technology," Nuclear Engineering International, Jun. 1986, pp. 1–7 and drawing.
GKN, "Final Safeguards Summary Report on the Dodewaard Nuclear Power Plant," Mar. 1967, pp. Cover, 1-1-1, 3-6-2, 3 & 4 and FIGS. 3.6.1 & 3.6.3.
Argonne National Laboratory (ANL), "The EBWR Experimental Boiling Water Reactor," May 1957, pp. Cover and 30–48.

*Primary Examiner*—Donald P. Walsh
*Assistant Examiner*—Frederick H. Voss
*Attorney, Agent, or Firm*—J. E. McGinness

[57] ABSTRACT

A boiling water reactor includes a pressure vessel containing a reactor core, chimney, steam separator assembly, and steam dryer assembly therein, with the vessel being filled with reactor water to a normal water level through the steam separator assembly. A plurality of control rod drives extend downwardly from the bottom of the pressure vessel and are operatively joined to control rods extending downwardly into the reactor core. The chimney includes a plurality of channels disposed above the core and laterally spaced apart to define guide slots for receiving the control rods as they are selectively translated upwardly out of the core by the control rod drives. The chimney has a vertical height for increasing the normal water level above the reactor core and for providing a space for the control rods withdrawn from the reactor core by the bottom-mounted control rod drives. The control rods are selectively withdrawn upwardly from the core and inserted downwardly into the core by the control rod drives, which also are effective for selectively releasing the control rods for allowing gravity to insert the control rods into the core.

12 Claims, 4 Drawing Sheets

BOILING WATER REACTOR INCLUDING SPLIT CONTROL ROD DRIVES

TECHNICAL FIELD

The present invention relates generally to nuclear reactors, and, more specifically, to an improved boiling water reactor.

BACKGROUND ART

A conventional boiling water reactor (BWR) includes a pressure vessel containing a nuclear reactor core above which are disposed in turn conventional steam separators and dryers. The vessel is filled with a cooling and moderating fluid such as water to a predetermined normal water level located generally near the middle of the steam separators. The core boils the water for generating a steam-water mixture which rises upwardly into the steam separators, which remove some of the water therefrom, with additional water being further removed therefrom from the steam dryers positioned above the steam separators. The dried steam is conventionally discharged from the vessel to a conventional steam turbine, for example, which powers an electrical generator for generating electrical power provided to an electrical utility grid.

A typical BWR is controlled by a plurality of control rods which extend downwardly from the core through conventional guide tubes extending from the bottom of the core to the lower head of the pressure vessel which defines therebetween a lower plenum. Extending downwardly from the lower head are a plurality of conventional control rod drives (CRDs) which are effective for selectively inserting the control rods upwardly into the core for reducing reactivity therein, and for selectively withdrawing the control rod downwardly from the core for increasing reactivity therein. Accurate intermediate positions of the control rods may be obtained by using a conventional drive screw which is selectively rotated in opposite directions by a conventional stepper motor to selectively translate upwardly and downwardly a ball nut threadingly engaged therewith. An elongate piston rests on the ball nut and is coupled to a respective control rod for raising and lowering the control rod as the ball nut is correspondingly translated. In order to obtain relatively instantaneous insertion of the control rods during a SCRAM operation, a pressurized fluid such as water is conventionally channeled through the CRD for lifting the piston and in turn lifting the control rod independently of the ball nut.

In order to fully withdraw the control rods from below the core, the guide tubes extending between the core and the vessel lower head must have a vertical height approximately equal to the length of the control rods. The height of the core also has a vertical height approximately equal to the length of the control rods so that the control rods may be fully inserted therein. The conventional steam separators additionally require a suitable vertical height for effectively separating water from the steam-water mixture. And additional vertical height is required for the steam dryer disposed above the steam separators.

Accordingly, the overall height of the pressure vessel must be suitable for containing these several components and for allowing the effective functioning thereof. A typical pressure vessel for a BWR sized for generating steam to power a turbine-generator for providing electrical power to the electrical utility grid is about 21 meters tall, with the reactor generating on the order of about 1,000 megawatts electric (MWe) and higher. Such a large pressure vessel, which is typically made from steel, has a correspondingly high weight requiring large cranes for the assembly thereof into a power plant.

A conventional BWR typically includes conventional recirculation pumps which operate for channeling downwardly the water within the pressure vessel in a conventional annular downcomer surrounding the core, which recirculated water enters the lower plenum and flows upwardly through the core. Since the water used to generate the reactor steam also cools the reactor, systems are typically provided to ensure that adequate water is always contained within the pressure vessel and above the core during all modes of operation of the reactor, including abnormal modes such as that occurring in a conventional loss-of coolant accident (LOCA) wherein the coolant water leaks from the reactor system and must be suitably replaced for maintaining an adequate level of water within the pressure vessel above the core.

In one type of advanced BWR, a gravity-driven cooling system (GDCS) includes a pool of water located outside the pressure vessel at an elevation above the reactor core to provide makeup water in a LOCA situation for example. In order to use the GDCS makeup water, the reactor pressure vessel must be first depressurized in a conventional manner to sufficiently reduce the pressure therein so that the pressure head of the elevated GDCS makeup water is sufficient to force the makeup water into the vessel to supplant the lost reactor water for maintaining the reactor water level above the core. Since depressurization of the pressure vessel takes several minutes, the vessel continues to lose its coolant water either as a liquid or from the steam being generated and discharged therefrom, which loss of water must be suitably made up to ensure an adequate water level within the vessel.

One arrangement for ensuring adequate water level within the vessel is to provide a greater initial amount of water in the pressure vessel above the core by suitably increasing the normal elevation of the water level within the vessel. By initially providing more water within the vessel, adequate reserves of the water therein may be maintained during a LOCA situation until the vessel may be suitably depressurized and makeup water provided thereto from the GDCS pool. The increased normal water level within the vessel, however, requires a corresponding increase in the height of the pressure vessel, which correspondingly increases its manufacturing complexity and weight.

Furthermore, in another abnormal situation involving an accidental trip of all the recirculation pumps, recirculation of the coolant water within the vessel will occur solely by natural recirculation flow of the water therein with the core-heated water rising, and the relatively cooler water within the downcomer falling. By increasing the normal water level as described above. The natural recirculation flow of the coolant water within the vessel is also increased, which is effective for providing additional margin against conventionally known nuclear-thermal-hydraulic instability of the coolant water following an all-pump trip. Furthermore, the increased normal water level is also effective for improving conventional thermal margins and peak pressures for other types of plant operating transient conditions.

Analysis indicates that an increase in the normal water level within the pressure vessel of about 7 meters is required both to apply an effective gravity-driven cooling system in a LOCA situation, and to achieve suitably stable operation following an all recirculation pump trip situation for a reactor sized for generating about 1350 MWe. However, in order to provide the additional 7 meters of water above the reactor core, the entire pressure vessel must be extended 7 meters above the core which would increase the normal length thereof from about 21 meters to at least 28 meters. Such a large pressure vessel is near the current fabrication limits, and near the current crane capacity limits for assembling the vessel in the power plant. The relatively large pressure vessel increases the complexity and cost of its use within the power plant.

OBJECTS OF THE INVENTION

Accordingly, one object of the present invention is to provide a new and improved boiling water reactor (BWR).

Another object of the present invention is to provide an improved BWR having an increased normal water level above a reactor core therein without correspondingly increasing the length of the pressure vessel.

Another object of the present invention is to provide an improved BWR having an increased normal water level therein with bottom-mounted control rod drives having gravity-aided SCRAM capability.

Another object of the present invention is to provide an improved BWR having an increased normal water level above the core thereof which concurrently provides space for withdrawal of the control rods from the core and for providing guidance thereof.

DISCLOSURE OF INVENTION

A boiling water reactor includes a pressure vessel containing a reactor core, chimney, steam separator assembly, and steam dryer assembly therein, with the vessel being filled with reactor water to a normal water level through the steam separator assembly. A plurality of control rod drives extend downwardly from the bottom of the pressure vessel and are operatively joined to control rods extending upwardly into the reactor core. The chimney includes a plurality of channels disposed above the core and laterally spaced apart to define guide slots for receiving the control rods as they are selectively translated upwardly out of the core by the control rod drives. The chimney has a vertical height for increasing the normal water level above the reactor core and for providing a space for the control rods withdrawn from the reactor core by the bottom-mounted control rod drives. In a preferred embodiment, the control rods are selectively withdrawn upwardly from the core and inserted downwardly into the core by the control rod drives, which also are effective for selectively releasing the control rods for allowing gravity to insert the control rods into the core.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawings in which:

MODE(S) FOR CARRYING OUT THE INVENTION

Figure 1:
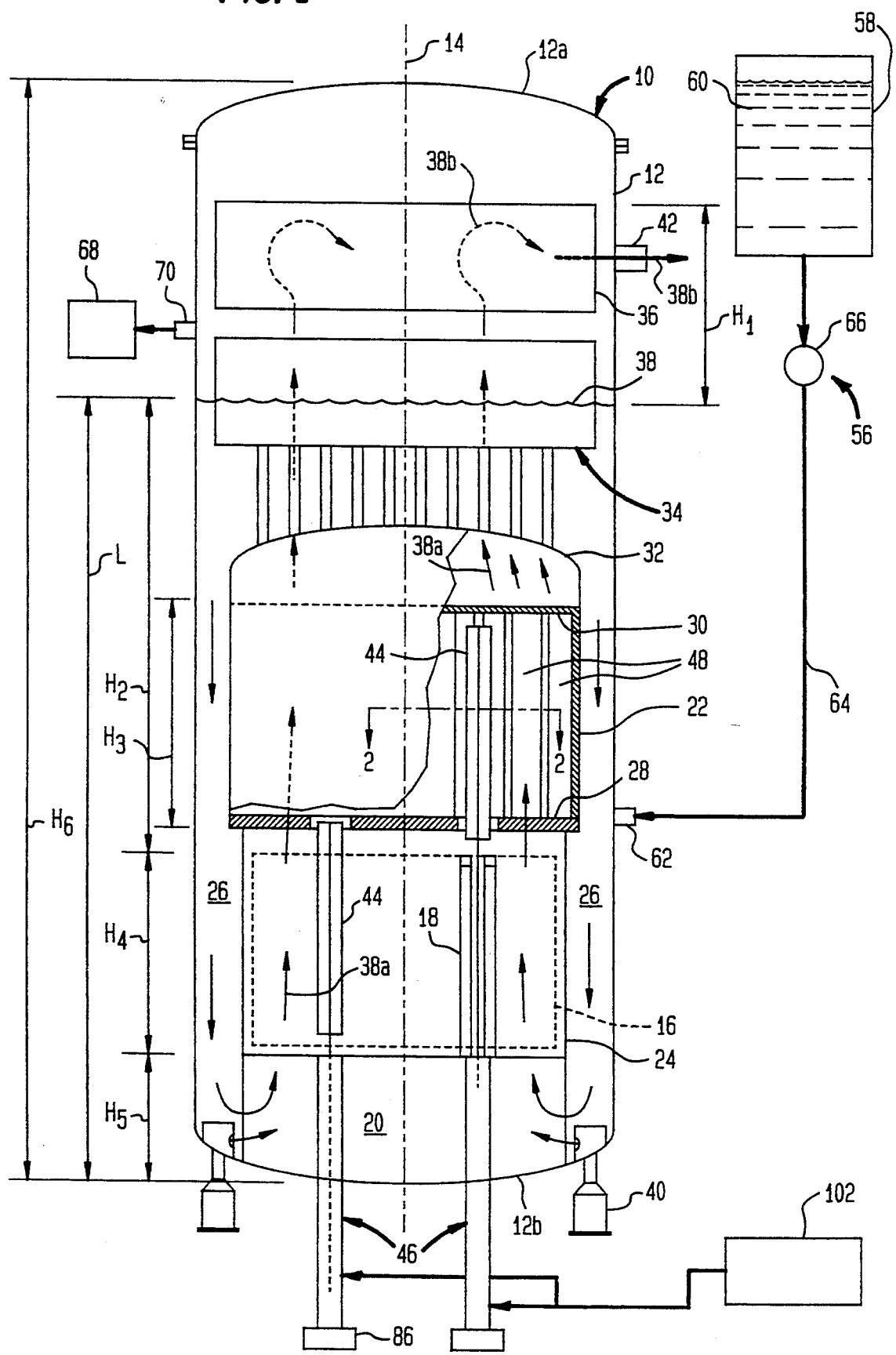
FIG. 1 is an elevational schematic representation of a boiling water reactor in accordance with one embodiment of the present invention.

Illustrated schematically in FIG. 1 is an exemplary boiling water reactor (BWR) 10 including a cylindrical pressure vessel 12 having a longitudinal centerline axis 14. The vessel 12 includes a conventionally removable upper head 12a, and a lower head 12b. Disposed inside the vessel 12 is a conventional annular reactor core 16 containing a plurality of elongate, laterally spaced apart, conventional nuclear fuel bundles 18 additionally shown in FIG. 2. The core 16 is disposed in the vessel 12 above the lower head 12b to define a lower plenum 20 therebetween.

In accordance with one embodiment of the present invention, an annular or cylindrical chimney 22 extends upwardly from the core 16 in the vessel 12 in flow communication with the core 16. Surrounding the core 16 is a conventional annular shroud 24 which extends downwardly from the chimney 22 to the lower head 12b. The core 16 and the chimney 22 are spaced radially inwardly from the inner surface of the vessel 12 to define a conventional annular downcomer 26 in flow communication with the lower plenum 20. The chimney 22 includes a lower grid 28 disposed at the top of the core 16, an upper grid 30 spaced upwardly from the lower grid 28, and a top manifold 32 defining an open plenum above the upper grid 30.

A conventional steam separator assembly 34 includes conventional standpipes and steam separators which extend upwardly from the chimney 22 in flow communication with the chimney top manifold 32. A conventional steam dryer assembly 36 is spaced upwardly above the steam separator assembly 34 and below the vessel upper head 12a in flow communication with the steam separator assembly 34.

The vessel 12 is filled with a reactor water 38 to a nominal or normal vertical water level L measured from the vessel lower head 12b. The reactor water 38 acts as both a coolant and moderator for the core 16. The normal water level L is preferably disposed at an elevation through the steam separator assembly 34 at about half its height as is conventionally known.

A plurality of conventional recirculation pumps 40 extend through the vessel lower head 12b and into the downcomer 26 for conventionally pumping the water 38 downwardly from the downcomer 26 and into the lower plenum 20 for flow upwardly through the reactor core 16. The core 16 therefore receives the water 38 recirculated downwardly through the downcomer 26, through the lower plenum 20 and upwardly therein, with the core 16 being conventionally effective for boiling the water 38 to generate a steam-water mixture 38a which flows upwardly from the core 16 and through the chimney lower grid 28, chimney 22, and upper grid 30 into the chimney top manifold 32. From the chimney top manifold 32 the steam-water mixture 38a flows conventionally upwardly into the steam separator assembly 34 and in turn through the steam dryer assembly 36 for removing water therefrom for discharging primarily steam 38b from the vessel 12 through a conventional outlet nozzle 42. The outlet nozzle 42 is conventionally joined to a conventional steam turbine, for example, for powering a conventional electrical generator to produce electrical power for an electrical utility grid (not shown).

A plurality of conventional nuclear control rods 44 are selectively positionable in the core 16 in accordance with one embodiment of the present invention between the fuel bundles 18 for conventionally controlling reactivity in the core 16. Only two control rods 44 are illustrated in FIG. 1 for clarity of presentation, with it being understood that a suitable number thereof, for example several hundred, are actually used in a conventional reactor core.

Also in accordance with one embodiment of the present invention, a plurality of control rod drives (CRDs) 46 extend at least downwardly from the vessel lower head 12b and are operatively joined to respective ones of the control reds 44 for selectively translating the control rods 44 upwardly out of the core 16 and downwardly into the core 16. In the preferred embodiment, one CRD 46 is provided for each of the control rods 44.

In a conventional BWR, control rod drives extend downwardly from the vessel lower head and include conventional control rod guide tubes extending between the vessel lower head and the bottom of the core (not shown). The guide tubes have a length approximately equal to the length of the control rods themselves so that the control rods may be fully withdrawn downwardly from the core and into the guide tubes within the pressure vessel.

By utilizing the split CRD arrangement disclosed above, with the CRDs 46 extending downwardly from the vessel lower head 12b and the control rods 44 being withdrawn upwardly from the core 16 into the chimney 22, the conventional, relatively long control rod guide tubes between the bottom of the core and the vessel lower head may be eliminated. Since the control rods 44 in accordance with the present invention are withdrawn upwardly above the core 16, no guide tubes are necessary below the core 16 for suitably guiding translation of the control rods 44 or for providing a vertical space for storing the control rods 44 when they are fully withdrawn from the core 16. Instead, the CRDs 46 are effective for raising the control rods 44 upwardly into the chimney 22 for their withdrawal from the core 16, and for lowering the control rods 44 from the chimney 22 and into the core 16.

FIG. 1 illustrates one exemplary control rod 44 on the left side of the core 16 in its fully inserted position in the core 16, and a second exemplary control rod 44 on the right side of the core 16 in its fully withdrawn position disposed within the chimney 22. In this way, the chimney 22 may itself provide for an increase in the normal water level L above the core 16 without a corresponding increase in the overall height of the pressure vessel 12 since the core 16 may be positioned more closely adjacent to the vessel lower head 12b upon elimination of the conventional control rod guide tubes therebetween as described in more detail below. And, the chimney 22 may be used additionally for guiding upwardly the control rods 44 as well as providing flow channels for confining the flow of the steam-water mixture 38a from the core 16 upwardly toward the steam separator assembly 34 for improved performance.

Figure 2:
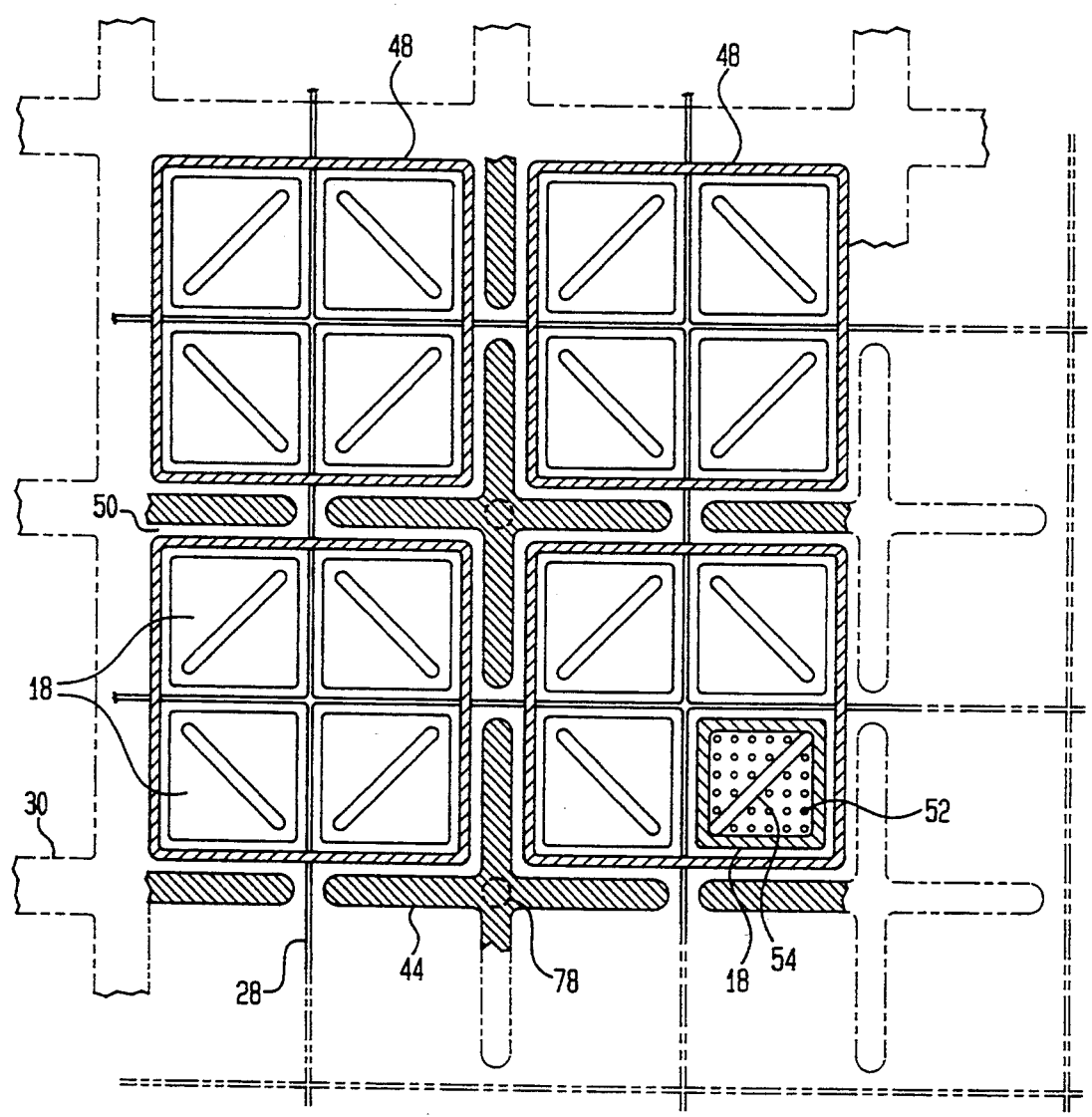
FIG. 2 is a transverse, partly sectional view of a portion of the reactor core shown in FIG. 1 taken along line 2—2.

More specifically, since the flow of the steam-water mixture 38a upwardly from the core 16 is turbulent, a plurality of removable chimney channels or tubes 48 are disposed in the chimney 22 above the core 16 and are laterally spaced apart from each other as shown in more particularity in FIG. 2 to define therebetween guide slots 50 for slidably receiving respective ones of the control rods 44 translated upwardly out of the core 16 by the CRDs 46. As shown in FIG. 2, the channels 48 are preferably vertically aligned above and with the fuel bundles 18 for receiving and channeling upwardly therefrom to the steam separator assembly 34 the steam-water mixture 38a. Not only do the chimney channels 48 provide guides for the translation of the control rods 44 upwardly, but they provide partitions to separate the upward flow of the steam-water mixture 38a to ensure predictability of the pressure drop therethrough and the two-phase (liquid and vapor) flow distributions of the steam-water mixture 38a laterally across the chimney 22. Chimneys including partitioned risers are conventional for providing these benefits. However, the chimney channels 48 provide an improved, more simple configuration for additionally allowing the control rods 44 to be withdrawn upwardly above the core 16 instead of downwardly therefrom, as well as providing the guide slots 50 for guiding the withdrawal of the control rods 44 from the core 16 in addition to allowing an increase in the normal water level L above the core 16 by a reduction in the height of the vessel 12 between the bottom of the core 16 and the vessel lower head 12b by the elimination of conventional control rod guide tubes.

As illustrated in FIG. 2, each of the control rods 44 preferably has a cruciform transverse configuration or section, and each of the chimney channels 48 has a preferably square configuration and is imperforate. Four adjacent ones of the chimney channels 48 are disposed together so that the guide slots 50 defined therebetween collectively have a cruciform configuration for receiving and guiding a respective one of the control rods 44. Referring to both FIGS. 1 and 2, the chimney upper grid 30 is in the exemplary form of a square lattice and the chimney channels 48 are supported therefrom by hanging downwardly into the chimney 22. For example, the tops of the chimney channels 48 may include radially outwardly extending flanges which are simply supported in complementary recesses defined in the upper grid 30 so that they may be easily inserted therein or removed therefrom during assembly and disassembly. The chimney channels 48 may otherwise be conventionally supported from the upper grid 30 by conventional gimbals for example. The chimney channels 48 may additionally or alternatively be supported by the lower grid 28 by being simply rested thereon, for example, in a complementary recess therein.

In the preferred embodiment of the invention illustrated in FIG. 2, each of the fuel bundles 18 has a conventional square configuration and each includes a plurality of conventional elongate, tubular fuel rods 52 as shown in one, exemplary fuel bundle 18 in FIG. 2. Each fuel bundle 18 includes a conventional handle 54 extending upwardly from its top for conventionally inserting and withdrawing the fuel bundle 18 from the core 16. In the preferred embodiment illustrated in FIG. 2, each of the chimney channels 48 is vertically disposed above and aligned with, and is sized for covering four of the fuel bundles 18 in a square array for channeling the steam-water mixture 38a upwardly therefrom and through the chimney channel 48. Each of the fuel bundles 18 may therefore be inserted or withdrawn directly through the chimney channel 48 without the removal thereof if desired. In other embodiments of the invention, the chimney channels 48 may be first removed upwardly from the chimney 22 for allowing access to the fuel bundles 18 disposed therebelow so that the fuel bundles 18 may be removed and replaced with new fuel bundles 18.

This preferred alignment also allows the control rods 44 to be withdrawn upwardly between the fuel bundles 18 and between the chimney channels 48 in the guide slots 50 while leaving the interior of the chimney channels 48 open to prevent obstruction of the primary upward flow of the steam-water mixture 38a therein directly from the fuel bundles 18. The secondary upward flow of the steam-water mixture 38a through the guide slots 50 is therefore distinct from the primary flow.

Accordingly, the chimney 22 partitioned by the chimney channels 48 serves several functions by providing a space for housing the control rods 44, which therefore allows the control rods 44 to be withdrawn upwardly from the core 16, with the channels 48 also providing the guide slots 50 for guiding upwardly the control rods 44 without the need for additional guiding structure. The chimney channels 48 also effectively channel upwardly the steam-water mixture 38a to prevent crossflow transversely across the chimney 22 for obtaining improved flow distributions from the core 16 with predictable pressure drops thereof through the chimney 22. Furthermore, the chimney 22 also allows for an increase in the normal water lever L as described above.

More specifically, the reactor 10 as illustrated in FIG. 1 preferably further includes a gravity-driven cooling system (GDCS) 56 which has a pool 58 of makeup water 60 disposed vertically above the normal water level L of the vessel 12 at a vertical height $H_1$. The pool 58 is conventionally joined in flow communication with an inlet nozzle 62 of the vessel 12 by a conventional conduit 64 in which is disposed in serial flow communication a conventional valve 66. The valve 66 is normally closed for preventing flow of the makeup water 60 into the vessel 12, and is conventionally openable in response to a LOCA situation, for example, for selectively draining by gravity the makeup water 60 into the vessel 12. The makeup water 60 will be drained into the vessel 12 by its pressure head due to being elevated above the water level L at the height $H_1$. However, since that pressure head is substantially below the normal pressure within the pressure vessel 12, the pressure vessel 12 must first be suitably depressurized to a sufficiently low pressure for allowing the pressure head of the makeup water 60 in the pool 58 to drain the makeup water 60 into the vessel 12. Accordingly, a conventional automatic depressurization system 68 is joined in flow communication with the pressure vessel 12, through a conventional venting nozzle 70 for example, for initially venting the pressure within the vessel 12 to about atmospheric pressure so that the valve 66 may then be opened to allow draining of the makeup water 60 by gravity into the vessel 12.

In order to provide a normal water level L at a height $H_2$ above the top of the reactor core 16 which is greater than a conventional level, the chimney 22 is provided as described above and has a height $H_3$ between the lower and upper grids 28 and 30 which is approximately the height of the control blades 44 for allowing the control blades 44 to be fully withdrawn from the core 16 and into the chimney 22. The core 16 has a height $H_4$ which is equal to the height of the fuel bundles 18, and which is also about the height of the control blades 44, so that the control blades 44 may be fully inserted into the core 16. Since conventional control rod guide tubes are not required between the bottom of the core 16 and the vessel lower head 12b, the lower plenum 20 has a height $H_5$ which is less than the height $H_4$ of the core 16 for reducing the overall height $H_6$ of the pressure vessel 12 measured between the upper and lower heads 12a and 12b. The height of the vessel 12 which would conventionally be provided between the core 16 and the lower head 12b for the control rod guide tubes may be reduced since the guide tubes are no longer required, with the vessel 12 being instead lengthened between the core 16 and the steam separator assembly 34 by incorporating the chimney 22 having the height $H_3$. In this way, the overall height $H_6$ of the pressure vessel 12 may remain about the same as a conventional pressure vessel, for example at about 21 meters, with more length being provided between the core 16 and the separator assembly 34 instead of between the vessel lower head 12b and the core 16. Accordingly, the normal water level above the core 16, i.e. height $H_2$, may be increased over that contained in a conventional boiling water reactor for providing improved performance of the vessel 12 with the gravity-driven cooling system 56 in a LOCA situation, as well as providing improved performance in an all pump trip of the recirculation pumps 40. Furthermore, the conventional skirt surrounding the steam separator assembly 34 may be vertically lengthened by about 1.5 meters in order to improve the capability to recover from swings of the water level L resulting from other conventional upset conditions in the BWR 10.

Figure 3:
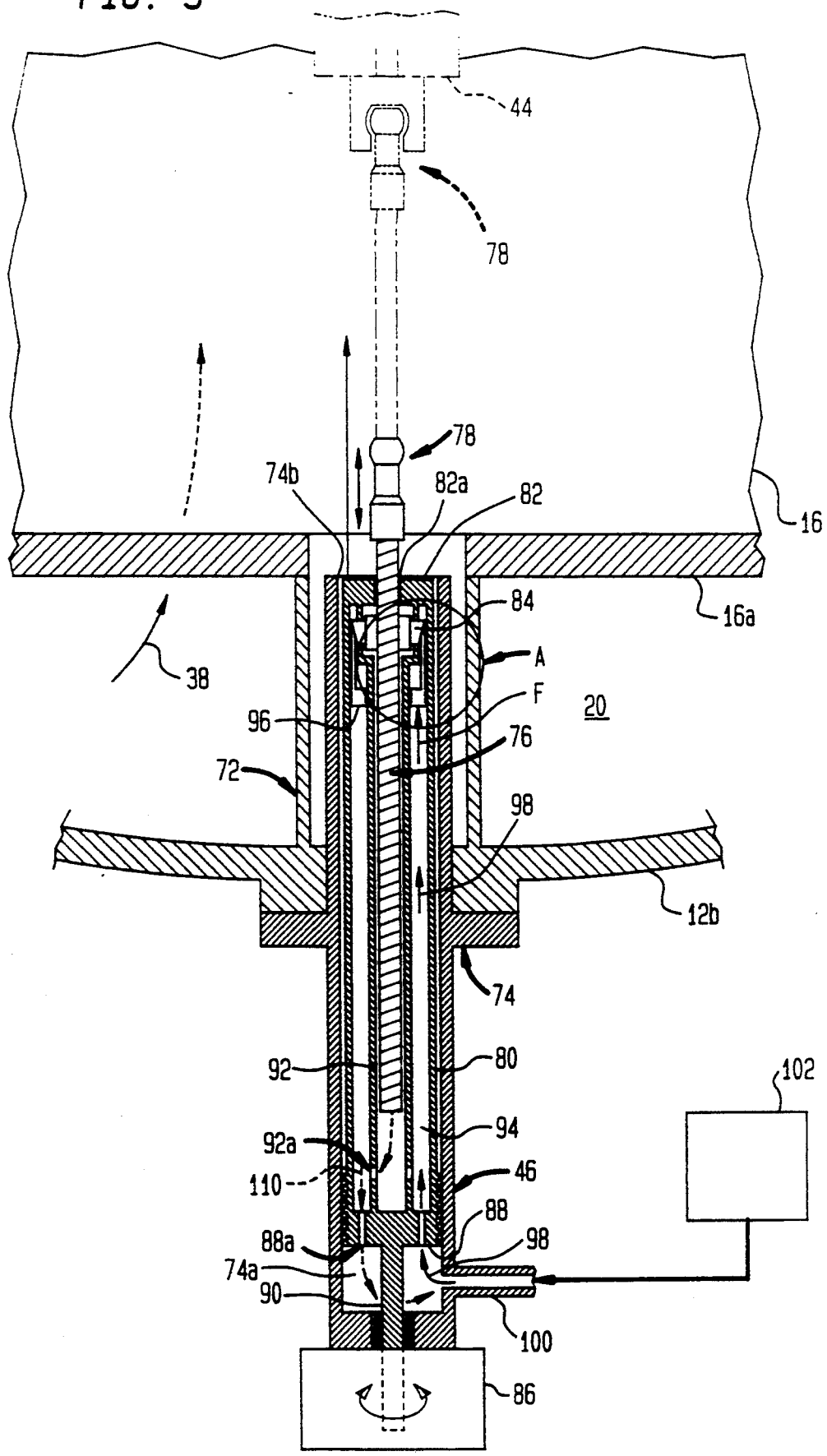
FIG. 3 is an elevational, partly sectional schematic view of one of the control rod drive assemblies illustrated in FIG. 1.
Figure 5:
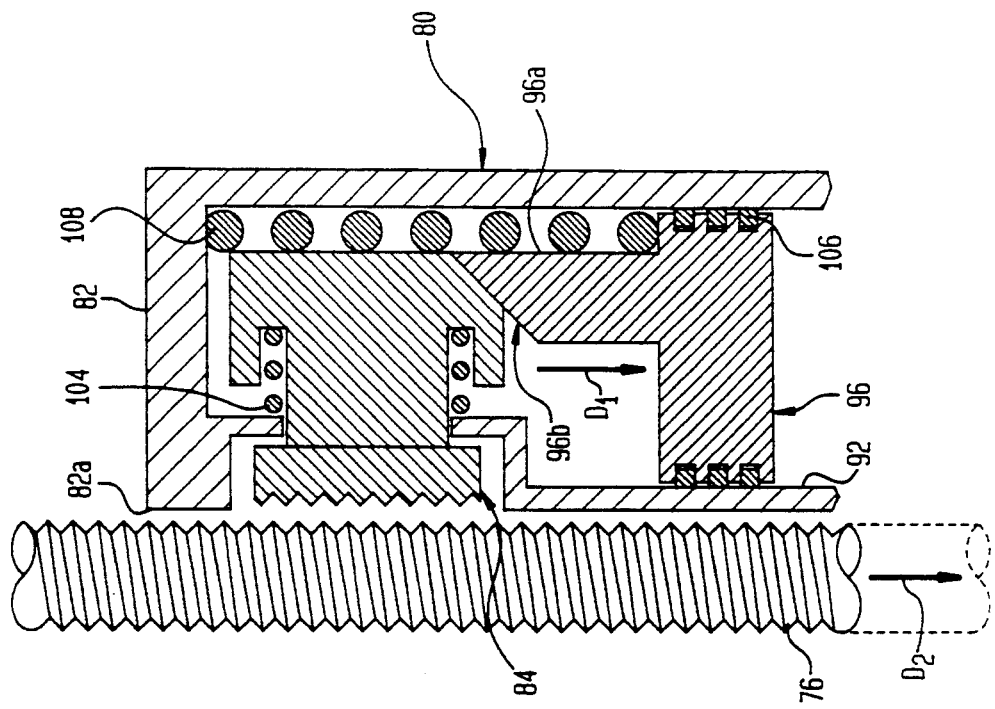
FIG. 5 is an enlarged sectional view of a portion of the control rod drive illustrated in FIG. 3 within the circle labeled A showing the drive nut disengaged from the drive screw.
Figure 4:
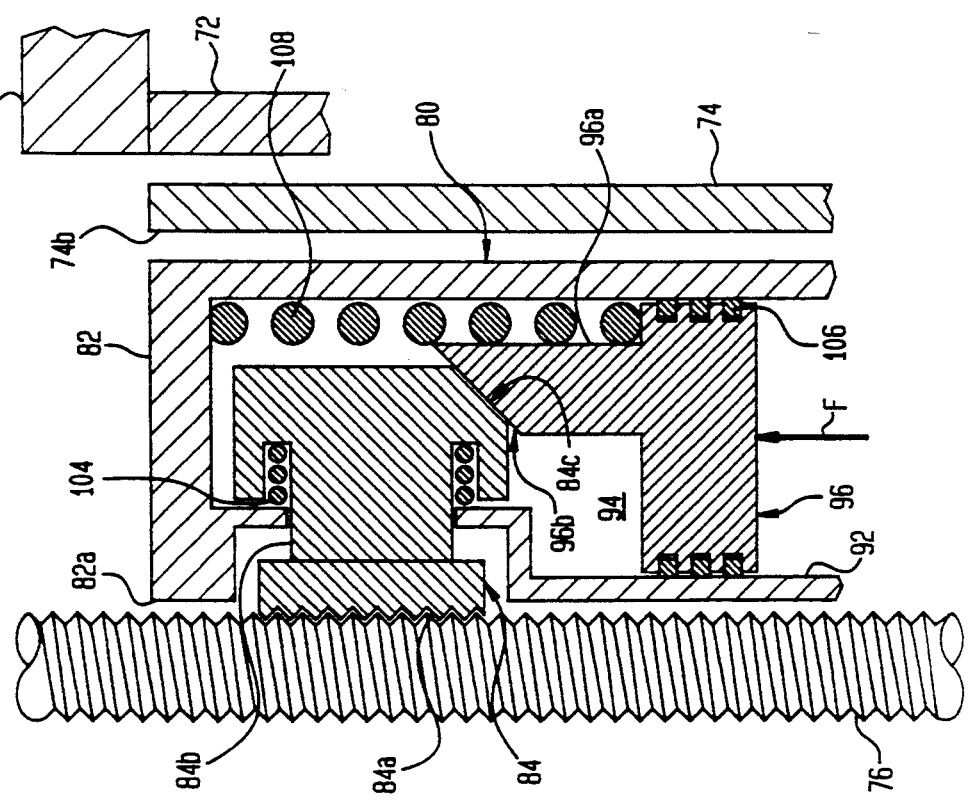
FIG. 4 is an enlarged sectional view of a portion of the control rod drive illustrated in FIG. 3 within the circle labeled A showing a drive nut engaged with a drive screw.

Illustrated in FIGS. 3–5 is an exemplary CRD 46 for translating a respective control rod 44, shown in phantom in FIG. 3 for clarity of presentation. Referring first to FIG. 3, a support tube 72 preferably extends upwardly from the vessel lower head 12b to a bottom plate 16a of the core 16 for supporting the core 16 in this exemplary embodiment. Each of the CRDs 46 includes a tubular CRD housing 74 conventionally fixedly and sealingly joined through the vessel lower head 12b for forming a portion of the pressure boundary for containing the pressurized reactor water 38 within the vessel 12. The CRD housing 74 includes a top portion which extends upwardly from the vessel lower head 12b to the core bottom plate 16a, and a lower portion which extends downwardly from and through the lower head 12b. An elongate drive rod 76 in the exemplary form of a drive screw extends upwardly from the CRD housing 74 and is conventionally releasably coupled to a respective one of the control rods 44 by a conventional bayonet coupling 78 for example. Alternatively, the coupling 78 may be in the form of a screw extending upwardly from the drive rod 76 which threadingly engages a complementary receptacle in the bottom of the control rod 44 for reducing the diameter of the coupling 78 to improve clearance between the channels 48.

The CRD 46 in the exemplary embodiment illustrated in FIG. 3 preferably includes means for selectively translating the drive rod 76 upwardly for withdrawing the control rod 44 upwardly from the core 16 and into the chimney 22, and for selectively translating the drive rod 76 downwardly for inserting the control rod 44 into the core 16 from the chimney 22. Means are also provided for selectively releasing the drive rod 76 for allowing gravity to insert the control rod 44 into the core 16 without obstruction from the CRD 46 itself.

More specifically, in a conventional bottom-mounted control rod drive, quick insertion upwardly into the core, during a SCRAM occurrence for example, is effected by providing a pressurized fluid over a piston for lifting the piston and the control rod vertically upwardly against the force of gravity. However, with the bottom-mounted CRDs 46 in accordance with the present invention which withdraw the control rods 44 upwardly above the core 16 into the chimney 22, suitable means must be provided for inserting the control rods 44 downwardly during a SCRAM occurrence without obstruction from the CRDs 46 since the SCRAM insertion direction is toward the CRDs 46 instead of away from the CRDs 46 as typically found in a conventional bottom mounted control rod drive.

Referring again to FIG. 3, the translating means for the drive rod 76 in the form of a drive screw include a drive tube 80 disposed inside the CRD housing 74, which includes a top endplate 82 having a central top aperture 82a therein through which the drive screw 76 extends upwardly into the core 16. A segmented drive nut 84 is operatively joined to and inside the drive tube 80 as shown in FIG. 3, and in more particularity in FIG. 4, and is selectively engageable and retractable from the drive screw 76 by the releasing means. As shown in FIG. 3, a conventional stepper motor 86 is operatively joined to the drive tube 80 for selectively rotating the drive tube 80, and in turn the drive nut 84, in a first, or clockwise, direction for translating downwardly the drive screw 76, and in a second, opposite, direction, i.e. counterclockwise, for translating upwardly the drive screw 76 when the drive nut 84 is engaged with the drive screw 76. The drive screw 76 is prevented from rotating by being joined to the control rod 44, which is prevented from rotating by the adjacent chimney channels 48 as shown in FIG. 2. By instead rotating the drive nut 84, the drive screw 76 must itself translate upwardly or downwardly depending upon the direction of rotation of the drive nut 84.

More specifically, the drive tube 80 further includes a bottom endplate 88 having a central drive shaft 90 extending downwardly through a lower manifold 74a of the CRD housing 74 which is conventionally operatively joined to the motor 86 for rotating the drive tube 80. The drive shaft 90 is preferably an integral portion of the bottom endplate 88 and has a splined end which conventionally slides into the motor 86 for being conventionally rotated thereby. This preferred connection of the drive shaft 90 to the motor 86 allows for easy removal of the drive tube 80 upwardly through the core as described in more detail below.

Disposed inside the drive tube 80 and around the drive screw 76 is a central core tube 92 extending upwardly from the drive tube bottom endplate 88 and integral therewith. The central core tube 92 is spaced radially inwardly from the inner surface of the drive tube 80 to define an annular core channel 94 therebetween which extends upwardly to the drive nut 84. A piston 96 in the form of an annulus is slidably disposed in the core channel 94 and is operatively coupled to the drive nut 84 for selectively engaging and releasing the drive nut 84 from the drive screw 76. The drive tube bottom endplate 88 preferably includes a plurality of fluid ports 88a disposed therethrough in flow communication between the lower manifold 74a and the core channel 94 inside the drive tube 80 for channeling a pressurized fluid 98, such as water, into the core channel 94 to generate a pressure force F bearing upwardly against the bottom of the piston 96 for engaging drive nut 84 with drive screw 76. The fluid ports 88a are also effective for venting the pressurized fluid 98 from the core channel 94 to release the pressure force F from the piston 96 for releasing the drive nut 94 from the drive screw 76.

The pressurized fluid 98 is conventionally selectively provided to the lower manifold 74a through a supply port 100 extending through the lower end of the CRD housing 74 in flow communication with the lower manifold 74a. A conventional fluid supply 102 is joined to the supply port 100 by a suitable conduit and is effective for selectively providing to the lower manifold 74a the pressurized fluid 98. The fluid supply 102 may be a conventional pump or a conventional accumulator providing the pressurized fluid 98 to the CRD housing 74 through a conventional valve. The fluid supply 102 is also effective for venting the pressurized fluid 98 from the lower manifold 74a.

More specifically, the outer diameter of the cylindrical drive tube 80 is suitably less than the inner diameter of the cylindrical CRD housing 74 for providing a relatively close fit therebetween so that the bottom endplate 88 forms an effective flow barrier to reduce or prevent leakage of the pressurized fluid 98 upwardly past the endplate 88a and between the drive tube 80 and the CRD housing 74, to maintain an effective pressure of the pressurized fluid 98 in the lower manifold 74a. The circumference of the bottom endplate 88 may include conventional labyrinth teeth as shown, or piston rings (not shown), cooperating with the inner surface of the CRD housing 74 to provide an effective fluid seal therebetween. In this way, the pressurized fluid 98 channeled into the lower manifold 74a is channeled to flow upwardly through the fluid ports 88a, the core channel 94, and against the bottom of the piston 96 for engaging the drive nut 84 with the drive screw 76. And, upon venting of the pressurized fluid 98 from the lower manifold 74a, the pressure thereof is released for disengaging the drive nut 84 from the drive screw 76 to release and allow gravity to insert the control rod 44 into the core 16.

Illustrated in more particularity in FIG. 4 is the top of the CRD housing 74 with the piston 96 effecting the engagement of the drive nut 84 with the drive screw 76. The drive nut 84 has at least two complementary segments, for example each being about 180° in extent, with each segment including screw threads 84a for engaging the drive screw 76 as shown, and a first shank 84b extending radially outwardly through a complementary aperture of the core tube 92. The first shank 84b has an enlarged head and includes an inclined first cam surface 84c facing downwardly toward the piston 96. A first compression spring 104 is disposed between the core tube 92 and the head of the first shank 84b for biasing the drive nut 84 away from the drive screw 76 for allowing unobstructed travel of the drive screw 76 either upwardly or downwardly through the core tube 92. Each segment of the drive nut 84 is identical, with corresponding springs 104 for separately biasing each segment.

Referring again to FIG. 4, the piston 96 has an inner diameter larger than the outer diameter of the core tube 92, and an outer diameter smaller than the inner diameter of the drive tube 80 for allowing the piston 96 to sealingly slide upwardly and downwardly within the core channel 94. The outer and inner diameters of the piston 96 may include suitable grooves and piston rings 106 to reduce leakage of the pressurized fluid 98 upwardly past the piston 96 for maintaining the pressure force F when desired. Extending upwardly from the piston 96 is an annular second shank 96a having an inclined, or conical second cam surface 96b being complementary in angle of inclination with the first cam surface 84c in abutting slidable contact therewith. For example, the first and second cam surfaces 84c, 96b are preferably inclined at about 45° from the longitudinal axis of the drive screw 76 so that the upwardly directed pressure force F acting on the piston 96 urges the piston 96 upwardly as shown in FIG. 4, so that the second cam surface 96b slides against the first cam surface 84c for exerting a lateral force to engage the nut threads 84a with the drive screw 76 and overcome the biasing force of the first spring 104. A second compression spring 108 is disposed between the top endplate 82 and the top of the piston 96 for biasing the piston 96 downwardly away from the drive nut 84 for allowing the first spring 104 to release the drive nut 84 from the drive screw 76 as shown in FIG. 5. When the pressure force F is removed from the piston 96, the second spring 108 urges the piston 96 downwardly in the direction $D_1$ illustrated in FIG. 5, and the first spring 104 urges the drive nut 84 radially outwardly away from the drive screw 76 into a retracted position. The first and second springs 104 and 108 are preferably sized so that the pressure force F generated against the piston 96 by the pressurized fluid 98 is effective for lifting upwardly the piston 96 against the second spring 108 to allow the second cam surface 96b to slide against the first cam surface 84c to urge the drive nut 84 radially inwardly toward the drive screw 76 and against the first spring 104 to engage the drive nut 84 with the drive screw 76.

In this way, when the drive nut 84 engages the drive screw 76 as shown in FIGS. 3 and 4, the motor 86 may be selectively operated for rotating the drive tube 80 either clockwise or counterclockwise, which in turn rotates the drive nut 84 therewith for translating the drive screw 76 upwardly or downwardly for either withdrawing or inserting the control rod 44. When the pressure fluid 98 is vented through the supply port 100, the pressurize force F is removed from the piston 96, the drive nut 84 is disengaged from the drive screw 76, and gravity will cause the control rod 44 to drop for insertion into the core 16 without obstruction. By retracting the segmented drive nut 84, the drive screw 76 is allowed to freely fall within the core tube 92 without obstruction.

The fluid supply 102 may vent the lower manifold 74a to a pressure suitably less than that found in the core 16 so that the control rod 44 may be inserted more quickly with the assistance of the resulting differential pressure between the core 16 and the vented lower manifold 74a. As shown in FIG. 3, the core tube 92 preferably includes a plurality of vent ports 92a adjacent to the fluid ports 88a in the drive tube bottom end 88 for allowing the fluid in the core tube 92 to be vented in turn through the vent ports 92a, the core channel 94, and the fluid ports 88a, into the lower manifold 74a and out the CRD housing 74 through the supply port 100 as the drive screw 76 is translated downwardly inside the core tube 92.

During a SCRAM insertion of the control rod 44 into the core 16, the drive nut 84 is disengaged from the drive screw 76 as shown in FIG. 5 and the drive screw 76 is allowed to drop downwardly inside the core tube 92 in the direction $D_2$ also shown in FIG. 5. As shown in dashed line in FIG. 3, fluid 110 is displaced by the downwardly moving drive screw 76 in the core tube 92 and is channeled downwardly through the vent ports 92a and in turn out of the CRD housing 74. The fluid 110 may either be portions of the reactor water 38 or the pressurized fluid 98, or both, which find their way into the core tube 92. The size of the vent ports 92a and the clearance between the top aperture 82a and the drive screw 76 are suitably selected to ensure that a suitable pressure force F may be maintained against the piston 96 to selectively engage the drive nut 84 with the drive screw 76, as well as for allowing release of the fluid 110 from inside the core tube 92 during insertion of the drive screw 76 therein.

In a preferred embodiment of the present invention, the CRD housing 74 includes an open top end 74b facing upwardly toward the core 16 and preferably extending to the core bottom plate 16a. The drive tube 80 is predeterminedly sized smaller in diameter than the CRD housing top end 74b for being upwardly removable from the CRD housing 74 without obstruction. In a conventional boiling water reactor, bottom-mounted control rod drives are typically removed from the pressure vessel downwardly below the pressure vessel lower head. This requires that suitable access space be provided below the pressure vessel, and suitable means must be provided for preventing leakage of the reactor coolant during disassembly and assembly of the control rod drives. However, in accordance with one feature of the present invention, the entire drive tube 80, including the structures therein, may be conveniently removed from within the CRD housing 74 upwardly through the core 16 by a conventional hoist contained in the power plant.

Referring again to FIG. 1, the vessel upper head 12a may be conventionally removed during a maintenance operation to allow access inside the vessel 12 with conventional removal of the steam dryer and separator assemblies 36 and 34 in turn. The chimney top manifold 32 is then conventionally removed, followed in turn by removal of the fuel bundles 18 either through the chimney channels 48 as described above or after removal of the chimney channels 48. The drive tubes 80 are then accessible through the core 16 and may be simply removed upwardly from within the CRD housing 74. By utilizing the conventional spline joint between the drive shaft 90 and the motor 86 (FIG. 3), the motor 86 may remain behind as part of the pressure boundary when the drive tube 80 is lifted from the CRD housing 74.

Accordingly, the improved BWR 10 disclosed above provides a new configuration having bottom-mounted, upwardly retractable, and top-removable fine motion control rod drives 46 in combination with the partitioned chimney 22. An increased normal water level L may therefore be obtained for improving natural circulation flow and softening the effects of transient operation, with the ability to apply gravity-driven core cooling through an adequate inventory of in-vessel coolant during depressurization of the vessel 12 in the event of a LOCA. The configuration is compact and utilizes the common space provided by the chimney 22 for multiple purposes, including the elimination of conventional control rod guide tubes between the core 16 and the vessel lower head 12b while providing a space for retraction of the control rods 44 upwardly from the core 16; the chimney channels 48 provide the guide slots 50 for guiding the upward and downward translation of the control rods 44; the chimney channels 48 prevent crossflow within the chimney 22 for controlling the upward rise of the steam-water mixture 38; and, the chimney 22 itself allows for an increased normal water level L above the core 16 with a corresponding reduction below the core 16 without requiring a substantial increase in the height of the pressure vessel 12.

Furthermore, although the space between the core 16 and the vessel lower head 12b is reduced, bottom-mounted CRDs 46 may still be used. The control rods 44 and the CRDs 46 are split in space vertically by the core 16, with the chimney channels 48 providing a space for retracting upwardly the control rods 44 while guiding the vertical translation thereof. The preferred chimney channels 48 are discrete members each separately supported by the upper grid 30 and separately removable therefrom. Each chimney channel 48 is relatively simple in structure and may simply be a four-sided imperforate tube, with adjacent channels 48 defining therebetween the guide slots 50.

The CRDs 46 themselves may utilize a drive rod in the form of the drive screw 76 for providing fine motion control of the control rods 44 at precise intermediate positions within the reactor core 16 as well as providing fast, SCRAM insertion of the control rods 44 downwardly toward the CRDs 46 without obstruction therefrom. The segmented drive nut 84 is selectively disengaged as described above to allow the drive screw 76 and the control rod 44 joined thereto to drop by gravity downwardly toward the CRD 46 without obstruction.

The above arrangement also allows for upward removal of the CRD drive tube 80 for improved maintenance of the CRDs 46 without requiring access below the vessel lower head 12b for that purpose and without requiring additional means for preventing leakage of the reactor water 38 during such a maintenance operation.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

We claim:

1. A boiling water reactor comprising:
   a pressure vessel having an upper head and a lower head;
   a reactor core containing a plurality of laterally spaced apart fuel bundles disposed in said vessel above said lower head to define therebetween a lower plenum;
   a chimney extending upwardly from said core in flow communication therewith;
   said core and said chimney being spaced radially inwardly from an inner surface of said vessel to define an annular downcomer in flow communication with said lower plenum;
   a steam separator assembly extending upwardly from said chimney in flow communication therewith;
   a steam dryer assembly spaced upwardly above said steam separator assembly in flow communication therewith and below said upper head;
   said vessel being fillable with reactor water to a level through said steam separator assembly, with said core receiving said reactor water recirculated downwardly through said downcomer, through said lower plenum, and upwardly into said core, said core being effective for boiling said reactor water to generate a steam-water mixture which flows upwardly through said chimney and into said steam separator assembly and in turn through said steam dryer assembly for removing water therefrom for discharging steam from said vessel;
   a plurality of control rods selectively positionable in said core;
   a plurality of control rod drives (CRDs) extending downwardly from said lower head and operatively joined to respective ones of said control rods for selectively translating said control rods upwardly out of said core and downwardly into said core; and
   a plurality of channels disposed in said chimney above said core and laterally spaced apart from each other to define therebetween guide slots for receiving said control rods translated upwardly out of said core by said CRDs, said channels being aligned with said fuel bundles for receiving and channeling upwardly therefrom to said steam separator assembly said steam-water mixture.

2. A reactor according to claim 1, further comprising a gravity-driven cooling system including a pool of makeup water disposed vertically above said reactor water level of said vessel and in flow communication with said vessel for selectively draining by gravity said makeup water into said vessel; said core having a core height; and said lower plenum having a height less than said core height.

3. A reactor according to claim 2 wherein:
   each of said control rods has a cruciform transverse configuration; and
   each of said chimney channels has a square configuration, and four adjacent ones of said chimney channels are disposed together so that said guide slots defined therebetween collectively have a cruciform configuration for receiving and guiding a respective one of said control rods.

4. A reactor according to claim 3 wherein said chimney includes an upper grid, and said chimney channels are supported by hanging downwardly from said upper grid.

5. A reactor according to claim 3 wherein each of said fuel bundles has a square configuration, and each of said chimney channels is sized for covering four of said fuel bundles for channeling said steam-water mixture upwardly therefrom.

6. A reactor according to claim 1 wherein each of said CRDs comprises:
   a tubular CRD housing extending downwardly through said lower head;

a drive rod extending upwardly from said CRD housing and coupled to a respective one of said control rods;

means for selectively translating said drive rod upwardly for withdrawing said control rod upwardly from said core and into said chimney, and for selectively translating said drive rod downwardly for inserting said control rod into said core from said chimney; and means for selectively releasing said drive rod for allowing gravity to insert said control rod into said core.

7. A reactor according to claim 6 wherein:

said drive rod is a drive screw; and said translating means comprise:

a drive tube disposed inside said CRD housing and having a top aperture through which said drive screw extends upwardly;

a segmented drive nut operatively coupled to said drive tube, and selectively engageable and retractable from said drive screw by said releasing means; and a motor for selectively rotating said drive tube and in turn said drive nut in a first direction for translating downwardly said drive screw, and in a second, opposite, direction for translating upwardly said drive screw.

8. A reactor according to claim 7 wherein said drive tube comprises:

a bottom endplate having a drive shaft extending downwardly through a lower manifold of said CRD housing and operatively coupled to said motor for rotating said drive tube;

a central core tube extending upwardly from said drive tube bottom endplate around said drive screw, and spaced radially inwardly from an inner surface of said drive tube to define an annular core channel extending upwardly to said drive nut;

a piston slidably disposed in said core channel and operatively coupled to said nut for selectively engaging and releasing said drive nut from said drive screw; and said drive tube bottom end including a plurality of fluid ports disposed therethrough in flow communication between said lower manifold and said core channel for channeling a pressurized fluid into said core channel to generate a pressure force against said piston for engaging said nut and said drive screw, and for venting said pressurized fluid from said core channel to release said pressure force from said piston for releasing said drive nut from said drive screw.

9. A reactor according to claim 8, further comprising means for selectively providing said pressurized fluid to said lower manifold for engaging said drive nut with said drive screw, and for venting said pressurized fluid from said lower manifold for releasing said drive nut from said drive screw to allow gravity to insert said control rod into said core.

10. A reactor according to claim 9 wherein:

said drive nut comprises a first shank extending radially outwardly through said core tube and having an inclined first cam surface, and a first spring biasing said drive nut away from said drive screw in a retracted position;

said piston comprises a second shank extending upwardly toward said first cam surface and having an inclined second cam surface in abutting sliding contact with said first cam surface, and a second spring biasing said piston downwardly away from said drive nut for allowing said first spring to release said drive nut from said drive screw; and said first and second springs being sized so that said pressure force generated against said piston by said pressurized fluid is effective for lifting said piston upwardly against said second spring to allow said second cam surface to slide against said first cam surface to urge said drive nut radially inward toward said drive screw against said first spring to engage said drive nut with said drive screw.

11. A reactor according to claim 10 wherein said core tube includes a plurality of vent ports adjacent to said fluid ports in said drive tube bottom endplate for allowing fluid in said core tube to be vented in turn through said vent port, said core channel, and said fluid ports into said lower manifold as said drive screw is translated downwardly inside said core tube.

12. A reactor according to claim 7 wherein said CRD housing includes an open top end facing toward said core; and said drive tube is predeterminedly sized smaller than said CRD housing top end for being upwardly removable from said CRD housing without obstruction.

* * * * *